United States Patent [19]

Johnson

[11] Patent Number: 4,876,414

[45] Date of Patent: Oct. 24, 1989

[54] ELECTRICAL SERVICE FITTINGS AND SERVICE SYSTEM INCLUDING SAME

[76] Inventor: Ruben R. Johnson, 3609 West Castile Ct., Peoria, Ill. 61615

[21] Appl. No.: 327,793

[22] Filed: Mar. 23, 1989

[51] Int. Cl.⁴ .............................................. H02G 3/04
[52] U.S. Cl. ...................................................... 174/81
[58] Field of Search ................................... 174/81, 82

[56] References Cited

U.S. PATENT DOCUMENTS

| | | | |
|---|---|---|---|
| 1,407,308 | 2/1922 | Vibber | 174/81 X |
| 1,446,821 | 2/1923 | Bissell | 174/81 |
| 2,404,152 | 7/1946 | Weller | 174/81 |
| 3,328,513 | 6/1967 | Goldsobel | 174/81 |

*Primary Examiner*—Laramie E. Askin
*Attorney, Agent, or Firm*—Wood, Dalton, Phillips, Mason & Rowe

[57] ABSTRACT

A service system for receiving and distributing electrical cable in which an appropriate conduit has an upper head end and a lower meter end. A service entrance fitting is coupled to the head end of the conduit for receiving electrical cable from the exterior thereof and for channeling the cable to the condit. A service through and distribution fitting is coupled in the conduit intermediate the ends thereof for distributing electrical cable out through a side of the fitting. The cable entrance of the service entrance fitting and the side of the service pass through and distribution fitting have mouths for receiving and directing the electrical cable. Each fitting has a dome-shaped hood which defines the respective mouth and an integral hollow depending neck for interfacing with a top of a conduit section to position the hood in covering relation over the conduit. Each fitting includes an apertured separator yoke nestingly positionable in the mouth of the hood and having an integral depending hollow neck telescoped over the depending hollow neck of the hood. Therefore, the separator yoke can be readily manipulated in a telescoping direction as well as in a swiveling direction relative to the hood to facilitate feeding the cable through the respective fitting.

18 Claims, 2 Drawing Sheets

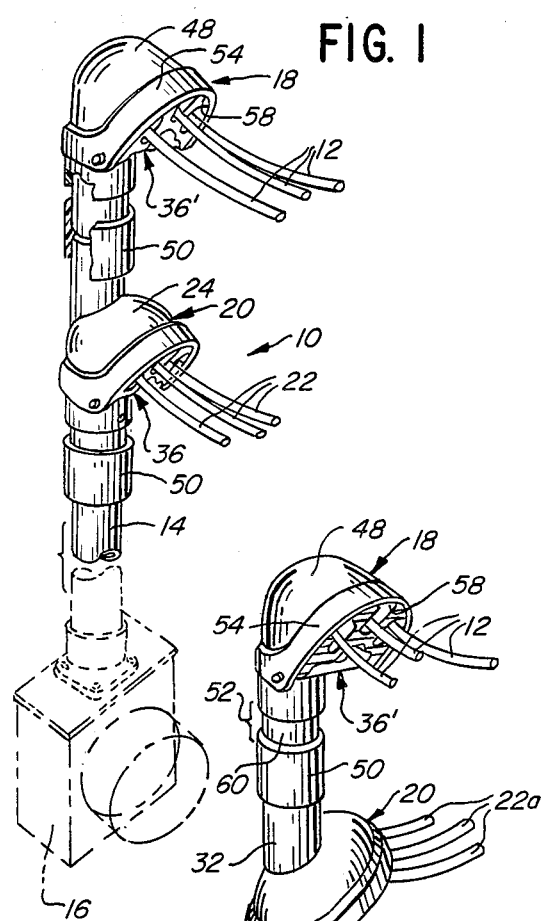
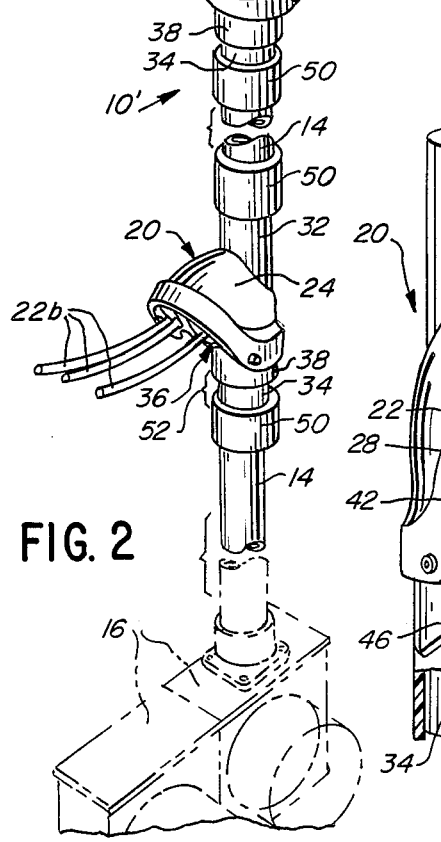
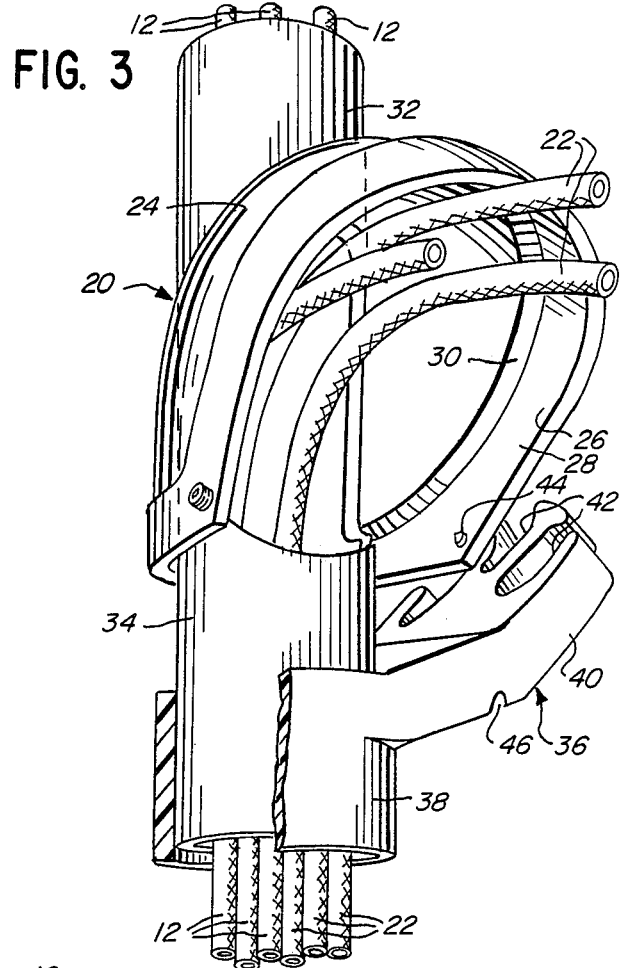
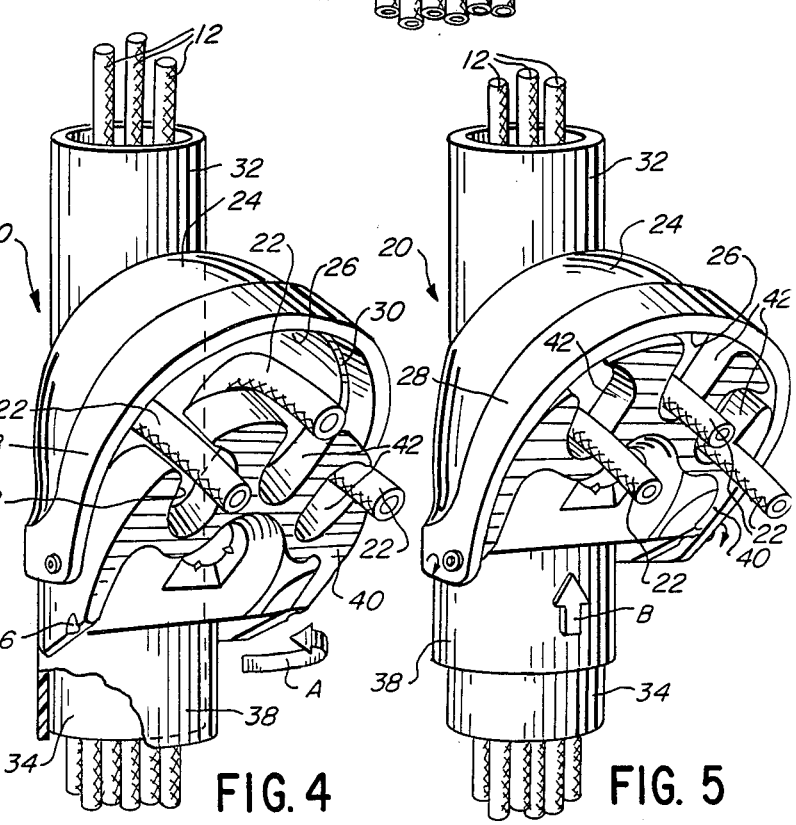

ELECTRICAL SERVICE FITTINGS AND SERVICE SYSTEM INCLUDING SAME

FIELD OF THE INVENTION

This invention generally relates to electrical service fittings for conduits and, particularly, to service entrance fittings and service pass through and distribution fittings for receiving and distributing electrical cable and channeling the cable to and through conduits.

BACKGROUND OF THE INVENTION

Providing electrical service from overhead power lines into buildings continuously causes problems, including safety problems, maintenance and man-hour problems, and the like. In fact, the continuing necessity of reading electrical meters itself causes problems when the metered service is located inside buildings.

For instance, when meters are located in interior locations, countless man-hours are lost in gaining access to the facility because the facility may not be occupied or the occupants may not be present. In addition, safety hazards are caused in entering buildings, ranging from physical hazards to dangerous animals, much less such situations as unsanitary conditions, flooded basements and the like.

Consequently, there is a continuing need to efficiently locate meters and service entry points outside of buildings. In fact, some agencies now are requiring exterior metered service. This continuously is being resisted by property owners because of costs involved. There is a definite need for a very inexpensive, easily assembled service system for service "drops" from utility power lines.

Another problem with service systems involves hazards and lost man-hours in installing or repairing the systems themselves. Service systems oftentimes are installed on poles or high up on the sides of buildings where workmen must function in precarious positions on ladders or the, like. Most service systems available, including their service entrance and service pass through and distribution fittings, are quite complicated, involving numerous parts, and resulting in tedious and time-consuming installation and maintenance procedures while the workman is in such precarious positions. This further magnifies the need for a service system and fitting construction which is extremely simple and involves the barest of minimum of component parts.

This invention is directed to solving such problems as identified above and satisfying the needs described.

SUMMARY OF THE INVENTION

An object, therefore, of the invention is to provide a new and improved service system for electrical cable ,and including new and improved service entrance and service pass through and distribution fitting constructions.

In the exemplary embodiment of the invention, the service system generally includes conduit means having an upper head end and a lower meter end. A service entrance head fitting is provided for coupling to the head end of the conduit means for receiving electrical cable from the exterior thereof and for channeling the cable to the conduit means. In other words, the service entrance head fitting receives the utility "drop" line from the utility company and directs the line through the conduit means to the property location meter. A service pass through and distribution fitting is coupled in the conduit means intermediate the ends thereof. This fitting receives electrical cable back from the meter and distributes the cable to the property location. Of course, more than one service pass through and distribution fitting can be coupled in the conduit means.

More specifically, the service entrance head fitting includes a dome-shaped hood having a mouth for passing the cable from the exterior into the service entrance fitting, and an integral depending hollow neck for interfacing with a top of the conduit means to position the hood in covering relation over the top of the conduit. An apertured separator yoke is nestingly positionable in the mouth of the hood and has an integral depending hollow neck telescoped over the depending hollow neck of the hood. Therefore, the separator yoke can be readily manipulated in a telescoping direction as well as in a swiveling direction relative, to the hood to facilitate feeding the cable into the service entrance fitting. It immediately can be seen that this entire fitting provides extraordinary manipulation capabilities and, remarkably, only involves two components.

The service pass through and distribution fitting, intermediate the ends of the conduit means, is similarly constructed of only two highly manipulable components. A dome-shaped hood is provided having a side opening mouth. The hood has an integral upwardly projecting hollow neck and an integral downwardly projecting hollow neck, the necks providing interfacing with opposed ends of the conduit means. Therefore, electrical cable can pass directly through the hollow necks of the fitting, and the electrical cable can be distributed out through the side opening mouth of the fitting. Again, an apertured separator yoke is nestingly positionable in the mouth of the hood. This yoke can be identical and interchangeable with the yoke for the service entrance fitting, with its telescoped connection to the dome-shaped hood providing for ready manipulation in a telescoping direction as well as in a swiveling direction relative to the hood to facilitate manipulation of the cable out of the conduit means.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

FIG. 1 is a perspective view of a service system incorporating the concepts of the invention, and including a top service entrance fitting and an intermediate service pass through and distribution fitting;

FIG. 2 is a view similar to that of FIG. 1, but including two service pass through and distribution fittings;

FIG. 3 is a perspective view, on an enlarged scale and partially broken away, of the service pass through and distribution fitting, with the telescoped separator yoke pivoted around to provide open access to the mouth of the dome-shaped hood;

FIG. 4 is a perspective view, on a reduced scale from that of FIG. 3, showing the separator yoke pivoted around in alignment with and partially inserted into the mouth of the hood;

FIG. 5 is a perspective view similar to that of FIG. 4, with the separator yoke pushed upwardly into nesting position within the hood;

DETAILED DESCRIPTION OF THE PREFERRED EMBODIMENT

Figure 6:
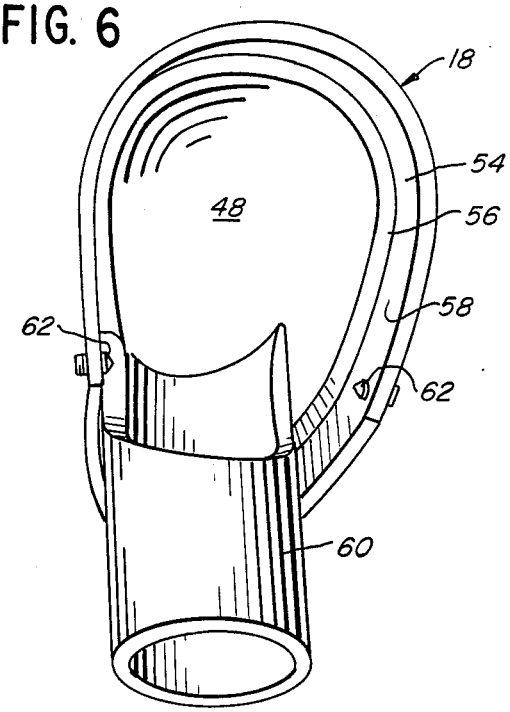
FIG. 6 is a perspective view of the hood component of the top service entrance fitting shown in FIGS. 1 and 2.

Referring to the drawings in greater detail, and first to FIG. 1, the invention contemplates a service system, generally designated 10, for receiving and distributing electrical cable 12, as from an overhead power line of a utility company. The service system includes conduit means 14 leading upwardly from an appropriate meter 16 which is shown in phantom. A top service entrance fitting, generally designated 18, is coupled at the top or head end of the conduit means, and a service pass through and distribution fitting, generally designated 20, is coupled intermediate the ends of the conduit means. At this point, it should be understood that the term "conduit" or "conduit means" as used herein and in the claims hereof actually represents a plurality of sections of conduit or piping in which the service fittings are interconnected.

For instance, FIG. 2 shows a service system, generally designated 10', which, again, includes a top service entrance fitting 18 and two service pass through and distribution fittings 20, with conduit "sections" 14 therebetween. In the service system of FIG. 2, it can be seen that two meters 16 are shown in phantom, representing metered service to two customers corresponding to the use of two service pass through and distribution fittings 20.

In other words, FIG. 1 shows electrical cable 12 which is from an overhead power line, for instance, of the utility company entering the service system through top service entrance fitting 18. That electrical cable will extend down through conduit 14, passing through service pass through and distribution fitting 20, and to meter 16. Electrical cable then will be fed back up through conduit 14 into service pass through and distribution fitting 20 and out to the customer, as at 22. Likewise, in FIG. 2, electrical cable 12 enters service entrance fitting 18, passes down through conduit 14 to meters 16, and electrical cable from the meters will provide metered service to two locations by means of service pass through and distribution fittings 20, as at 22a and 22b. Therefore, in the description of FIGS. 3–5, below, the numbers of wires of the electrical cable wiring system can be seen extending out of the ends of the service pass through and distribution fittings, corresponding to this description of the general electrical layout.

Referring to FIG. 3, one of the service pass through and distribution fittings 20 is shown in greater detail. Before proceeding, it should be understood that the general operation and manipulation of service pass through and distribution fitting 20, particularly the manipulation of the separator yoke relative to the hood, is identical for top service entrance fitting 18 (FIGS. 1 and 2) and, therefore, a duplicate description of the top service entrance fitting will not be given in detail.

More particularly, service pass through and distribution fitting 20 includes a dome-shaped hood 24 having a side opening mouth 26 defined by a flange 28 which is of slightly larger spherical dimensions than the hood to define an abutment shoulder 30. Formed integrally with hood 24 is an upwardly projecting hollow neck 32 and a downwardly projecting hollow neck 34. Power-supplying electrical cable 12 can be seen passing entirely through the fitting, i.e. downwardly through upper neck 32, through hood 24, and out through downwardly projecting neck 34 to the appropriate meter. Corresponding to the description above, electrical cable 22 is shown being fed upwardly into the fitting, through downwardly projecting neck 34 and out through mouth 26 of hood 24.

Service pass through and distribution fitting 20 includes a second component in the form of an apertured separator yoke, generally designated 36. Yoke 36 includes an integral depending hollow neck 38 telescoped over downwardly projecting hollow neck 34 of hood 24. The yoke also includes an outwardly projecting bifurcated insert portion 40 having apertures or slots 42 for receiving and separating the wires of cable 22.

Referring to the combined presentation of FIGS. 3–5 which represent sequential views of manipulating separator yoke 36 relative to hood 24, like numerals have been applied to like components in all views. Specifically, FIG. 3 shows yoke 36 moved downwardly of hood 24 in a telescoping manner by means of neck 38 of yoke 36 being telescoped over neck 34 depending from hood 24. The yoke is also shown swiveled about neck 34 to gain clear access to mouth 26 of the hood. To this end, necks 34 and 38 are cylindrically shaped to provide for this combined telescoping (or linear) and swiveling manipulative motion.

FIG. 4 shows a sequential view from that of FIG. 3, where yoke 36 has been swiveled in the direction of arrow "A" so that bifurcated portion 40 of the yoke is in alignment with mouth 26 of hood 24, and the yoke has been moved slightly upwardly into the mouth. It can be seen that the wires (three in number) now have been moved into alignment with apertures 42 in yoke portion 40.

FIG. 5 shows a sequential view wherein yoke 36 has been telescoped upwardly on neck 34 in the direction of arrow "B", such that the bifurcated portion 40 of the yoke is nestingly positioned within mouth 26 of hood 24 into abutment with shoulder 30 (FIG. 3). The wires of cable 22 now are completely separated from each other for distribution and service to the property location. In order to hold the yoke in the position of FIG. 5, inwardly projecting detents 44 (see FIG. 3) are formed on the inside of flange 28 which defines mouth 26, and detent recesses 46 are formed on the outside of flange 40 of yoke 36. Therefore, when in the position of FIG. 5, a snap-fit holding means is provided to retain the yoke in position within the mouth of the hood and properly position the wires of the cable.

As stated above, the manipulative operation of the components of upper service entrance fitting 18 will not be described in considerable detail for brevity purposes. However, suffice it to say that the upper service entrance fitting includes a yoke 36' (FIGS. 1 and 2) identical to yoke 36 described in FIGS. 3–5. The service entrance fitting has a dome-shaped hood 48 defining a mouth 58 for nestingly positioning the yoke and separating the wires of cable 12 as described in relation to FIGS. 3-5. Other details of the top service entrance fitting hood component will be seen when describing FIGS. 6 and 7, below.

From the foregoing, it can be seen that both service entrance fitting 18 and service pass through and distribution fitting 20 are fabricated of only two components which are telescopingly assembled and provide remarkable manipulation relative to each other to enable a workman to function efficiently even in the most precarious of positions. In fact, it readily can be seen that a workman could manipulate the yoke component relative to the hood component, as well as manipulate the cable wires, with a single hand, leaving his other hand available for support. In fact, the fittings can be assembled on appropriate conduit 14 with similar, most efficient manipulations.

The components of fittings 18,20 can be fabricated of various materials, such as PVC or other plastics or metal. If fabricated of metal, detent means 44,46 (FIG. 3) which easily can be molded in plastic material, might be replaced with such holding means as set screws or the like. For instance, a set screw might be threaded through flange 28 in similar locations as detents 44 for engaging the outside of bifurcated portion 40 of yoke 36. A set screw also might be used through neck 38 of the yoke for tightening against neck 34 of the hood component. The neck(s) of the hood component might be tightened to the conduit sections by set screws.

The ease of coupling fittings 18 or 20 in a conduit system is illustrated by referring back to FIGS. 1 and 2. For instance, both Figures show a lower conduit section 14 leading up from meter 16 to a conventional axial coupling 50, such couplings being known for joining the ends of coaxial conduit or piping, such as PVC pipe. Neck 34 which projects downwardly from hood 24 of service pass through and distribution fitting 20 is shown inserted into the top of coupling 50. In order to allow for the abovedescribed telescoping and swiveling manipulation of yoke 36, neck 34 should be sufficiently long for insertion into coupling 50 yet leaving a sufficient space, as at 52, to allow for the yoke to be moved downwardly out of the mouth of the hood and swiveled out of the way of the mouth, as shown in FIG. 3. Proceeding upwardly from service pass through and distribution fitting 20 in FIG. 2, it can be seen that neck 32 which projects upwardly from hood 24 of fitting 20, is inserted into another conventional coupling 50 which coaxially joins another conduit section 14. This sequence of interconnection of the fittings in a conduit system continues on upwardly through the second (or more) service pass through and distribution fitting 20 (as shown in FIG. 2) until reaching the top of the conduit means where another standard coupling 50 is used to interconnect top service entrance fitting 18 to the top of the conduit network.

In the event that the fittings are fabricated of such material as PVC, conduit sections 14, couplings 50 and the necks of the fittings themselves can be secured tightly together by standard PVC cement. Should it be desired to fabricate the fittings of metal material for use with metal conduit or piping, simple set screws can be used throughout the network for rigidifying the system.

Figure 7:
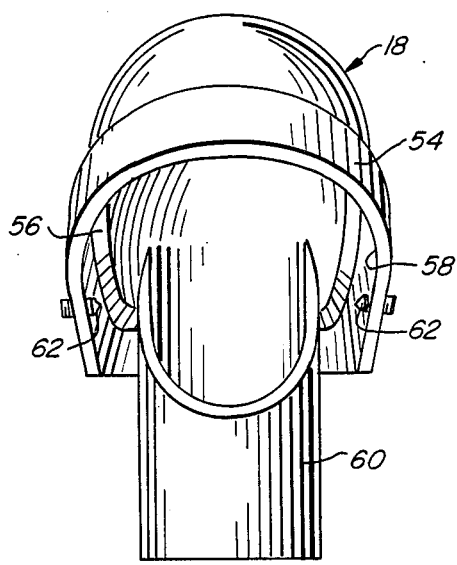
FIG. 7 is a front elevational view of the component of FIG. 6.

FIGS. 6 and 7 show in greater detail, the structure of service entrance fitting 18 of the hood component 48. As with hood 24 of service pass through and distribution fitting 20, hood 48 has a flange portion 54 defining an interior abutment shoulder 56 against which the bifurcated portion 40 (FIG. 3) of an identical or common yoke 36 can abut when nestingly positioned within a mouth 58 defined by flange 54. As with service pass through and distribution fitting 20, service entrance fitting 18 has a downwardly projecting or depending neck 60 about which neck 38 of a common yoke 36 is telescopingly received. Likewise, if the service entrance fitting is fabricated of moldable material, such as plastic, detents 62 can be molded integral with the inside of flange 54 for complementarily interengaging with detent recesses 46 (FIG. 3) of the common yoke 36. With either fitting 18 or 20, hood portions 48 and 24, respectively, are in covering relationship over the interior of the conduit, with hood 48 of service entrance fitting 18 completely covering the top of the conduit as shown in FIGS. 1 and 2.

Figure 8:
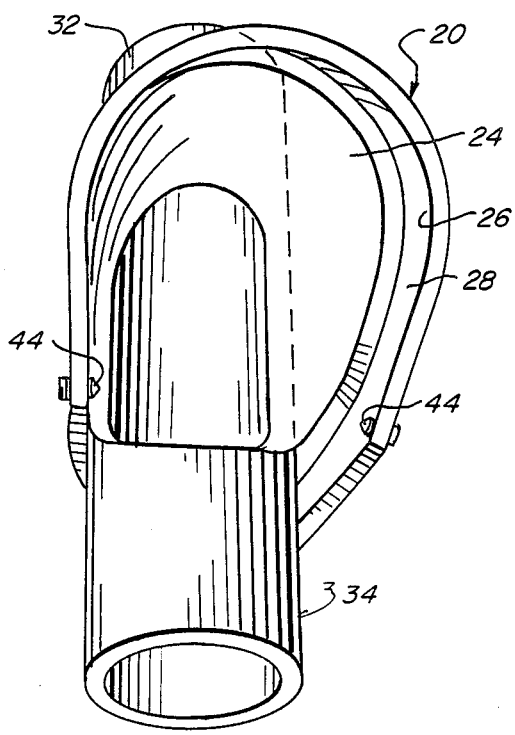
FIG. 8 is a perspective view of the hood component of the service pass through and distribution fitting.
Figure 9:
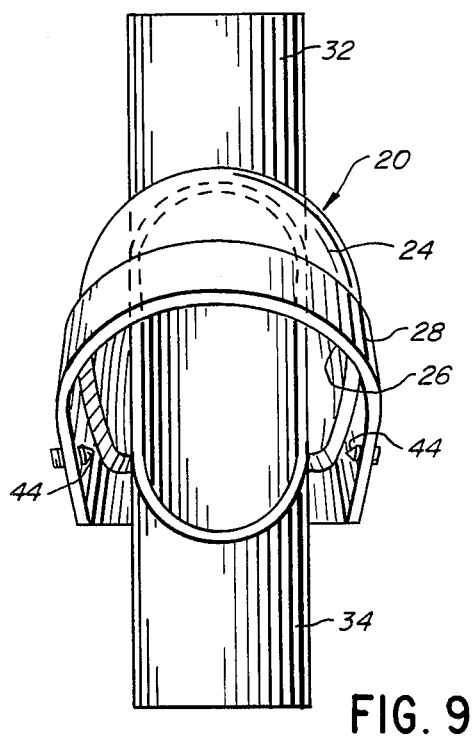
FIG. 9 is a front elevational view of the component of FIG. 8.

Lastly, FIGS. 8 and 9 are shown simply to give a better perspective view of the construction of the hood component of service pass through and distribution fitting 20 to show its similarity to the hood component of service entrance fitting 18 whereby a common or substantially identical yoke component 36 can be used with either fitting to further reduce the overall number of components to build up service fitting systems as shown in FIGS. 1 and 2.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

I claim:

1. A service entrance fitting for receiving electrical cable from the exterior thereof and for channeling the cable to a conduit, comprising:
    a dome-shaped hood having a mouth for passing the cable from the exterior into the service entrance fitting, and an integral depending hollow neck for interfacing with a top of the conduit to position the hood in covering relation over the top of the conduit; and
    an apertured separator yoke nestingly positionable in the mouth of the hood and having an integral depending hollow neck telescoped over the depending hollow neck of the hood whereby the separator yoke can be readily manipulated in a telescoping direction as well as in a swiveling direction relative to the hood to facilitate feeding the cable into the entrance fitting.

2. The service entrance fitting of claim 1 wherein the depending hollow neck of the hood and the depending hollow neck of the separator yoke are of cylindrical shapes.

3. The service entrance fitting of claim 1, including means for holding the separator yoke in nesting position in the mouth of the hood.

4. The service entrance fitting of claim 1 wherein the mouth of the hood extends oblique to the neck of the hood, and an apertured separator portion of the yoke complementarily extends oblique to the neck of the yoke.

5. The service entrance fitting of claim 1 wherein said hood comprises a unitary plastic component.

6. A service pass through and distribution fitting for electrical cable channelled through a conduit, comprising:

a dome-shaped hood having a side opening mouth, an integral upwardly projecting hollow neck and an integral downwardly projecting hollow neck, the necks providing interfacing with opposed ends of the conduit, and whereby electrical cable can pass directly through the hollow necks of the fitting and the electrical cable can be distributed out through the side opening mouth of the fitting; and an apertured separator yoke nestingly positionable in the mouth of the hood.

7. The service pass through and distribution fitting of claim 6 wherein said yoke has an integral depending hollow neck telescoped over the downwardly projecting hollow neck of the hood whereby the separator yoke can be readily manipulated in a telescoping direction as well as in a swiveling direction relative to the hood to facilitate feeding the cable out of the fitting.

8. The service pass through and distribution fitting of claim 6, including means for holding the separator yoke in nesting position in the mouth of the hood.

9. The service pass through and distribution fitting of claim 6 wherein the mouth of the hood extends oblique to the necks of the hood, and an apertured separator portion of the yoke complementarily extends oblique to the neck of the yoke.

10. The service pass through and distribution fitting of claim 6 wherein said hood comprises a unitary plastic component.

11. The service pass through and distribution fitting of claim 10 wherein said yoke comprises a unitarily molded plastic component.

12. A service system for receiving and distributing electrical cable, comprising:

conduit means having an upper head end and a lower meter end;

a service entrance fitting for coupling to the head end of the conduit means for receiving electrical cable from the exterior thereof and for channeling the cable to the conduit means, including a dome-shaped hood having a mouth for passing the cable from the exterior into the service entrance fitting, and an apertured separator yoke nestingly positionable in the mouth of the hood;

a service pass through and distribution fitting coupled in the conduit means intermediate the ends thereof, including a dome-shaped hood having a side opening mouth and pass through aperture means whereby electrical cable can directly pass through the hood, and an apertured separator yoke nestingly positionable in the mouth of the hood; and wherein the apertured separator yoke for both the service entrance fitting and the service pass through and distribution fitting are common components of substantially similar construction.

13. The service system of claim 12 wherein said dome-shaped hood of the service entrance fitting has an integral depending hollow neck for interfacing with a top of the conduit means to position the hood in covering relation over the top of the conduit means, and the separator yoke of the service entrance fitting has an integral depending hollow neck telescoped over the depending hollow neck of the dome-shaped hood.

14. The service system of claim 12 wherein said service pass through and distribution fitting has a dome-shaped hood having a side opening mouth, an integral upwardly projecting hollow neck and an integral downwardly projecting hollow neck, the necks providing interfacing with the conduit means, and whereby electrical cable can pass directly through the hollow necks of the service pass through and distribution fitting and the electrical cable can be distributed out through the side opening mouth of the service pass and distribution fitting.

15. The service system of claim 14 wherein the separator yoke of the service pass through and distribution fitting has an integral depending hollow neck telescoped over the downwardly projecting hollow neck of the hood of the service pass through and distribution fitting.

16. The service system of claim 15 wherein said dome-shaped hood of the service entrance fitting has an integral depending hollow neck for interfacing with a top of the conduit means to position the hood in covering relation over the top of the conduit means, and the separator yoke of the service entrance fitting has an integral depending hollow neck telescoped over the depending hollow neck of the dome-shaped hood.

17. The service system of claim 12, including means on the service entrance fitting and on the service pass through and distribution fitting for holding the respective separator yokes thereof in nesting position in the mouths thereof.

18. The service system of claim 12 wherein the mouths of both the service entrance fitting and the service pass through and distribution fitting extend oblique to the direction of the conduit means.

* * * * *